United States Patent
Cappiello

(10) Patent No.: US 10,262,048 B1
(45) Date of Patent: Apr. 16, 2019

(54) OPTIMIZATION OF MEMORY ANALYTICS

(71) Applicant: MicroStrategy Incorporated, Vienna, VA (US)

(72) Inventor: Scott Cappiello, San Marcos, CA (US)

(73) Assignee: MicroStrategy Incorporated, Vienna, VA (US)

( * ) Notice: Subject to any disclaimer, the term of this patent is extended or adjusted under 35 U.S.C. 154(b) by 464 days.

(21) Appl. No.: 14/792,875

(22) Filed: Jul. 7, 2015

Related U.S. Application Data

(60) Provisional application No. 62/021,603, filed on Jul. 7, 2014.

(51) Int. Cl.
*G06F 7/00* (2006.01)
*G06F 17/30* (2006.01)

(52) U.S. Cl.
CPC .... *G06F 17/30554* (2013.01); *G06F 17/3056* (2013.01); *G06F 17/30374* (2013.01)

(58) Field of Classification Search
CPC ......... G06F 17/30554; G06F 17/30374; G06F 17/3056
USPC .................................. 707/722–755
See application file for complete search history.

(56) References Cited

U.S. PATENT DOCUMENTS

| | | | |
|---|---|---|---|
| 6,687,695 B1 | 2/2004 | Miller et al. | |
| 6,826,556 B1 | 11/2004 | Miller et al. | |
| 7,024,236 B2 | 4/2006 | Ford et al. | |
| 7,769,783 B2 | 8/2010 | Rozenshtein et al. | |
| 9,454,671 B2 | 9/2016 | Engberg et al. | |
| 9,489,436 B2 | 11/2016 | Walter | |
| 2008/0183687 A1* | 7/2008 | Law | G06F 17/30389 |
| 2012/0233212 A1 | 9/2012 | Newton et al. | |
| 2012/0278321 A1* | 11/2012 | Traub | G06F 17/30657 707/736 |
| 2012/0323884 A1 | 12/2012 | Draese et al. | |
| 2014/0052752 A1 | 2/2014 | Schueler et al. | |
| 2014/0129493 A1* | 5/2014 | Leopold | G06F 17/30554 706/12 |
| 2014/0280066 A1* | 9/2014 | Petschulat | G06F 17/30539 707/722 |
| 2015/0052260 A1* | 2/2015 | Bott | H04W 4/16 709/232 |

(Continued)

*Primary Examiner* — Tuan A Pham
*Assistant Examiner* — Thai V Dang
(74) *Attorney, Agent, or Firm* — Fish & Richardson P.C.

(57) ABSTRACT

Methods, systems, and apparatus, including computer programs encoded on a computer storage medium, for optimization of memory analytics are disclosed. In one aspect, a method includes receiving, by a data storage system, a request to generate a visualization of a portion of data stored in the data storage system. The method includes providing, for display, the visualization of the portion of the data. The method includes accessing historical data that includes data indicating actions performed on previously displayed visualizations and corresponding portions of the data. The method includes generating an action to perform on the visualization and the portion of the data. The method further includes performing, in background, the generated action on the visualization and the portion of the data and suppressing results of the generated action. The method includes receiving a user specified action to perform on the visualization and the portion of the data.

19 Claims, 5 Drawing Sheets

(56) References Cited

U.S. PATENT DOCUMENTS

2015/0074037 A1 3/2015 Sarferaz
2015/0317348 A1 11/2015 Walter

* cited by examiner

OPTIMIZATION OF MEMORY ANALYTICS

CROSS-REFERENCE TO RELATED APPLICATION

This application claims the benefit of U.S. Patent Application No. 62/021,603, filed Jul. 7, 2014, the contents of which are incorporated by reference.

TECHNICAL FIELD

This description relates to optimizing in-memory data processing.

BACKGROUND

Computer systems are used to manage and store data in a structure known as a database. As such, computers can be used to analyze data and generate reports based on the analysis results. For instance, computer systems can filter data and calculate metric values based on the filtered data, ultimately providing a report including the calculated metric values. A database is an organized repository of data. There are various ways in which the data can be organized. Schemas are used to describe the different organizations of data.

Computers systems have two types of physical data storage—disk (e.g., hard drive) storage and Random Access Memory (RAM) storage. Typically, computer systems have more disk storage than RAM, but it can often take longer (e.g., in the range of 100-1,000 times longer) to read data from the disk than from RAM. This can result in noticeable performance degradation.

SUMMARY

An innovative aspect of the subject matter described in this specification may be implemented in method that includes the actions of receiving, by a data storage system, a request to generate a visualization of a portion of data stored in the data storage system; providing, for display, the visualization of the portion of the data; accessing historical data that includes data indicating actions performed on previously displayed visualizations and corresponding portions of the data; based on the historical data, generating an action to perform on the visualization and the portion of the data; performing, in background, the generated action on the visualization and the portion of the data and suppressing results of the generated action; receiving, from a user, a user specified action to perform on the visualization and the portion of the data; determining that a portion of the user specified action corresponds to the generated action; performing a portion of the user specified action that does not correspond to the generated action; and providing, for display, an updated visualization based on the portion of the user specified action that does not correspond to the generated action and the suppressed results.

These and other implementations can each optionally include one or more of the following features. The actions include based on the historical data, generating an additional action to perform on the updated visualization and the portion of the data; performing, in the background, the additional generated action on the updated visualization and the portion of the data and suppressing results of the additional generated action; receiving, from the user, an additional user specified action to perform on the updated visualization and the portion of the data; determining that the additional user specified action corresponds to the additional generated action; suppressing performance of the additional user specified action; and providing, for display, an additionally updated visualization based on the suppressed results.

The actions include based on the historical data, generating an additional action to perform on the updated visualization and the portion of the data; performing, in the background, the additional generated action on the updated visualization and the portion of the data and suppressing results based on the additional generated action; receiving, from the user, an additional user specified action to perform on the updated visualization and the portion of the data; determining that the additional user specified action does not correspond to the additional generated action; performing the additional user specified action; and providing, for display, an additionally updated visualization based on the additional user specified action.

Each action is a query or a request to filter the portion of the data. The action of accessing historical data that includes data indicating actions performed on previously displayed visualizations and corresponding portions of the data includes accessing historical data generated by the user. The action of accessing historical data that includes data indicating actions performed on previously displayed visualizations and corresponding portions of the data includes accessing historical data generated by a group of users that includes the user. The historical data further includes a time and date corresponding to each action and a location of a previous user who requested each action. The data storage system is an in-memory data store.

The action of accessing historical data that includes data indicating actions performed on previously displayed visualizations and corresponding portions of the data includes accessing historical data that includes data indicating actions performed on previously displayed visualizations of the portion of the data. The action of accessing historical data that includes data indicating actions performed on previously displayed visualizations and corresponding portions of the data includes accessing historical data that includes data indicating actions performed on previously displayed visualizations and corresponding portions of data from other data storage systems. The action of generating an action to perform on the visualization and the portion of the data includes determining that a likelihood that a request to perform the action will be received satisfies a threshold.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DETAILED DESCRIPTION

Figure 1:
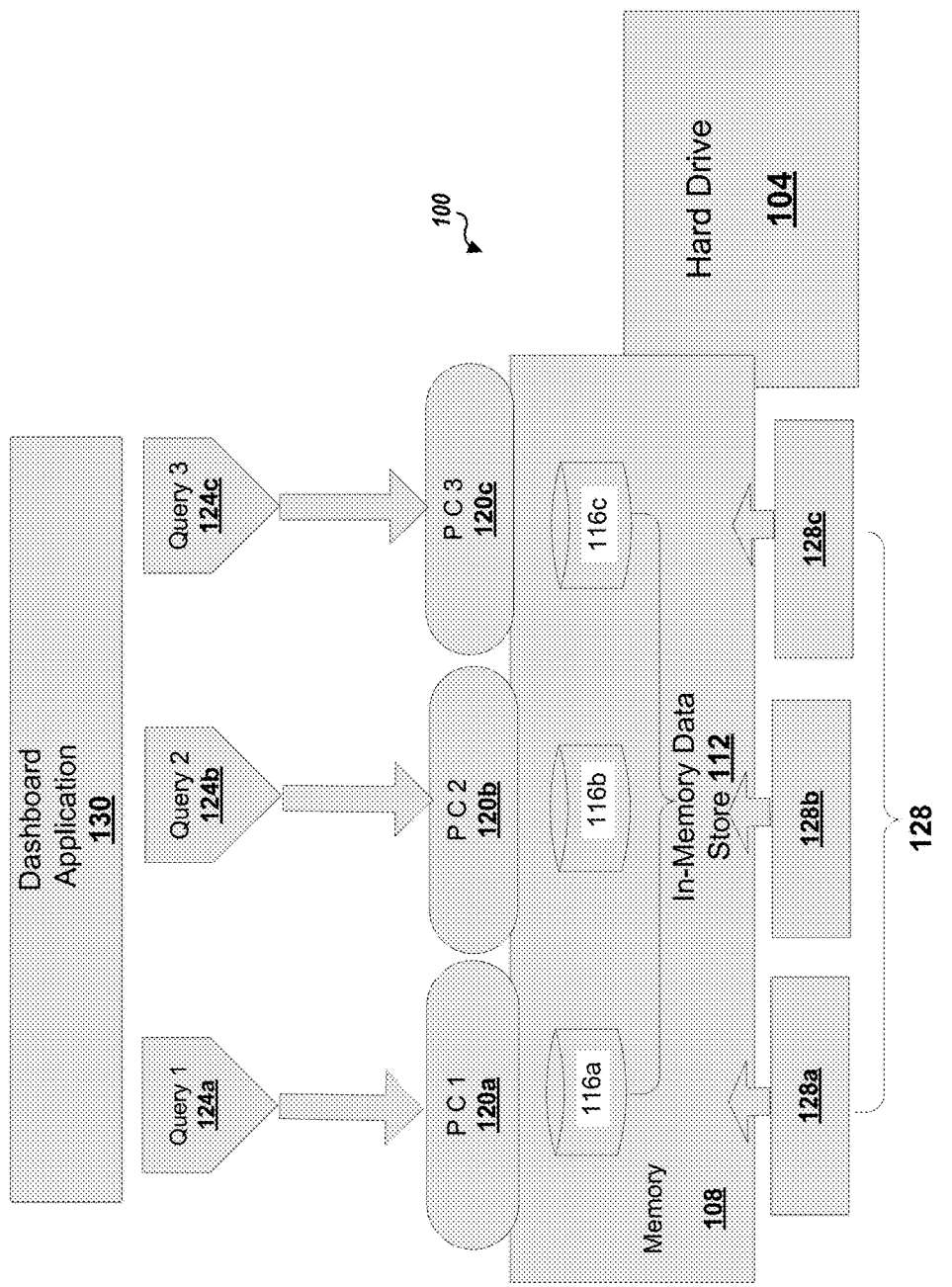
FIG. 1 is a block diagram of an example architecture of an analytic engine.

An analytic engine as disclosed herein can perform data analytics to predict data requests and queries expected from an application and/or a dashboard engine. For example, the analytic engine can include an in-memory analytic data store. The analytic engine optimizes data loaded in-memory, performs computations in advance, and executes queries in advance based on the analytics.

In some implementations, the analytic engine can include an analytic data store with a tightly-coupled dashboard/visualization engine. For example, systems and methods described herein can use information about an application and/or design aspects of a dashboard to generate queries to the analytic data store. In this manner, an analytic engine can optimize retrieving and delivering data from the data store to the application and/or dashboard. With this structure, the analytic engine can be used to build fast-response analytical applications for various platforms, such as web applications and/or mobile device applications. Techniques can include using dashboard information to combine dashboard visualizations comprising same or similar underlying data to generate fewer queries than would otherwise be generated if each visualization were to be processed separately.

In some implementations, the analytic engine can include a column-oriented, distributed, analytic data store that can provide fast responsiveness and data retrieval. For example, the analytic engine can include an in-memory analytic database or data store that is distributed over a plurality of independent data partitions associated with corresponding plurality of processing units (e.g., processor cores of a multi-core computer processor). A transaction on the in-memory analytic data store can include one or more queries performed on the data store. A series of such queries involving the in-memory data store can be processed in parallel across the plurality of processor cores. Example in-memory analytic engines are described in U.S. Provisional Application Nos. 61/931,975, filed Jan. 27, 2014, and 62/021,497, filed Jul. 7, 2014, the contents of which are incorporated in their entirety herein.

In some examples, the in-memory analytic data store can provide broad schema support. In these examples, any arbitrary schema can be loaded into the in-memory analytic data store. For instance, the in-memory analytic data store can support multiple and varied dimensional schemas. Dimensional schemas are types of database schemas that are used for storing and processing historical data. Dimensional schemas can be characterized in terms of facts, measures and dimensions. Facts describe data that can be analyzed, such as sales numbers or cost dollars. For example, facts can be aggregated. Measures are calculations based on facts. On the other hand, dimensions identify and categorize data. For example, dimensions describe data that can be used to generate groups and filters. A dimensional schema is a type of database schema in which facts or measures that quantify a business are stored separately from descriptive elements (or dimensions) that describe the business. A dimensional schema can be further categorized as a star or snowflake schema, where the objects of the star or snowflake schema are database tables.

FIG. 1 shows an example conceptual diagram of a computer system 100 implementing an analytic engine. For example, computer system 100 can be implemented on one or more computers (or nodes). As shown, computer system 100 can be conceptually represented as having two data storage areas, a hard disk 104 and a memory 108. The computer system 100 can include a dashboard engine 130. Dashboard engine 130 can include an interface (as described in detail below) for displaying, to a user, data visualizations, e.g. in the form of grids and/or graphs, based on underlying data. For example, a grid includes data arranged for display in a tabular format.

A graph can include data arranged for display in a graphical format. For example, a graph can include graphical reports in various forms of representation, including, e.g., a gauge representation, a funnel representation, an area representation, a vertical stacked bar representation, a line and horizontal bar combination representation, a bubble representation, and a pie chart representation.

For example, memory 108 can be a random access memory or a flash memory. In some implementations, memory 108 allows data items to be read and written in a substantially similar amount of time regardless of an order in which the data items are accessed. In this regard, memory 108 can be different from, for example, hard disk 104 where the time to read and write data items can vary significant depending on the physical locations of the data items in the recording medium and because of mechanical limitations, such as media rotation speeds and arm movement delays.

Memory 108 includes an in-memory data store 112. For example, the in-memory data store can be partitioned into one or more data sub sets 116*a-c*. In this example, one or more data sub sets 116*a-c* can include partitions (e.g. a portion) of one or more tables within data store 112. Although three data sub sets 116*a-c* are shown and described here, there can be fewer or more (perhaps many more) than the three data sub sets 116*a-c*. Each data sub set 116*a-c* is associated with one or more processing units 120*a-c*. Although three processing units 120*a-c* are shown and described here, there can be fewer or more (perhaps many more) than the three processing units 120*a-c*. In some examples, a processing unit 120*a* can be associated with more than one data sub set 116*a-c*.

For example, processing units 120*a-c* can be one or more processor cores of a multi-core processor. For examples, multi-core processors can have two cores (dual-core CPUs, for example AMD Phenom II X2 and Intel Core Duo), four cores (quad-core CPUs, for example AMD Phenom II X4, Intel's i5 and i7 processors), six cores (hexa-core CPUs, for example AMD Phenom II X6 and Intel Core i7 Extreme Edition 980X), eight cores (octo-core CPUs, for example Intel Xeon E7-2820 and AMD FX-8350), ten cores (for example, Intel Xeon E7-2850), or more. In some implementations, a multi-core processor implements multiprocessing in a single physical package.

In some implementations, the computer system 100 can be implemented across multiple nodes. For example, a first processing unit 120*a* can each be a processor core of a multi-core processor in a first node, and a second processing unit 120*b* can be a processor core of a multi-core processor in a second, different, node. In some implementations, while processing unit 120*a* is physically located in a first node (e.g., a first processor core in the first node), processing units 120*b* and 120*c* can be physically located in a second, different node (e.g., second, different processor cores in the second node). In some implementations, data sub set 116*a* can be physically located in the first node, and data sub sets 116*b* and 116*c*, corresponding respectively to each of processing units 120*b* and 120*c*, can be physically located in the second, different node. Although a few example combinations of processor cores and partitioned data sets are described here, any number of combinations of processor cores and partitioned data sets, spread out over a single node or multiple nodes, may be used.

In some examples, one or more database transactions can be processed in the form of one or more queries 124a-c to the in-memory analytic data store 112. For example, a high level database transaction can be divided into the multiple queries 124a-c. In some examples, the number of queries 124a-c can be as high as a number of parallel processing units 120a-c that are available to process the queries 124a-c in parallel. As shown, the queries 124a-c can be processed in parallel by the respective processing units 120a-c. For example, query 124a may require the summation of a column of data (e.g., numbers) residing in a portion of the data sub set 116a. For example, the column of data relates to sales made by a customer over a period of time. This summation operation can be handled by respective processing unit 120a. Substantially at the same time, a different (but perhaps related) operation, e.g., retrieving transaction dates for the sales fields being processed through the summation operation, can be handled by processing unit 120b operating on data sub set 116b. The results from respective queries 124a and 124b can be sent back to a query engine (see, e.g., FIG. 2 described in further detail below) to assemble the information for display or other operation, such as storage or further analysis.

For example, computer systems implementing the techniques described herein (e.g., computer system 100) use information about an application and/or design aspects of a dashboard engine 130 to generate queries 124a-c to the in-memory data store. For example, dashboard engine 130 can include a dashboard interface, as described in detail below, in which two or more grids (e.g., tables of data or other visualization of the data) can be based on same or similar content. In some implementations, the computer system 100 can cause a single combined query (e.g., only query 124a) or parallel queries (e.g., queries 124a-c) to be executed on the in-memory data store for the two or more grids.

In one scenario, dashboard engine 130 can have two visualizations representing sales trends over time through both a line chart and a grid of data. In the computer system 100, the data needed for the two example visualizations can be the same or similar. As such, the data can be accessed based on either a single query or multiple parallel queries to a same table or closely related tables in in-memory analytic data store 112. In some examples, dashboard engine 130 can include two or more visualizations based on selecting key performance indicators (KPIs) from a same set of underlying data in in-memory data store 112. Because the underlying data involved is the same, the visualizations can be executed together—e.g., a single query or multiple parallel queries can be executed together. In some implementations, dashboard engine 130 can include visualizations that are based on same or similar filtering criteria, and as such queries corresponding to these visualizations can be combined into a single query and/or executed together.

In some implementations, a data service engine 128 can receive data from multiple high volume data storage systems and load the received data into in-memory data store 112. In some examples, data service engine 128 can perform parallel data loading into data store 112 through parallel processes 128a-c. For example, processes 128a-c can load data from corresponding data sources into respective in-memory data store sub sets 116a-c in parallel. In some implementations, the loaded data can be all of the market intelligence data needed to generate output for an end user. For examples, the output can be displayed to the end user through an application interface, e.g., a dashboard/visualization engine as described in further detail below.

The in-memory analytic data store 112 can enable bigger data volume given its partitioned and parallel processing structure. For instance, certain in-memory technologies may be limited to two billion rows. By dividing datasets into partitions (e.g., data store sub sets 116a-c), each partition or sub set 116a-c can have up to two billion rows, which increases the overall data volume. The partitioning can be performed on a single node or over multiple nodes as described below. For single node partitioning, data partitions are distributed across multiple cores on a single machine and grids/views are processed in parallel across all cores on a single multi-processor node. For multiple node partitioning, data partitions are distributed within and across multiple nodes (e.g., machines) and queries processed in parallel within and across multiple nodes.

Computer system 100 can be configured differently depending on the type of application and the amount of data needed to support the application. For instance, for a market intelligence application that uses 2.2 billion rows, system 100 can have a memory footprint of 59 GB and can have a hardware configuration of a single server with 32 cores and 1 TB of RAM. For a social media application that uses 2.8 billion rows, system 100 can have a memory footprint of 100 GB and can have a hardware configuration of a single server with 40 cores and 1 TB of RAM. For an e-commerce application that uses 3.8 billion rows, system 100 can have a memory footprint of 500 GB and can have a hardware configuration of a single server with 80 cores and 1 TB of RAM. For a social media application that employs massively parallel processing techniques and uses 80 billion rows, system 100 can have a memory footprint of 5-6 TB and can have a hardware configuration of 100 worker nodes, each with 16 cores and 144 GB of RAM, which results in a total of 1600 cores and 14 TB of RAM.

Computer system 100 can be configured to support use case characteristics with data volume in the 100's of GB to 1 TB range. In these cases, system 100 can provide fast response time, as all executions are against in-memory datasets and datasets and queries are partition-friendly. System 100 can serve external-facing applications and dashboard interfaces, although some applications can be internal. The data volume that can be handled by system 300 may not be limited to a particular size, such as 1 TB. In fact, depending on the available nodes in system 300, a variety of data volumes can be serviced by system 300.

Figure 2:
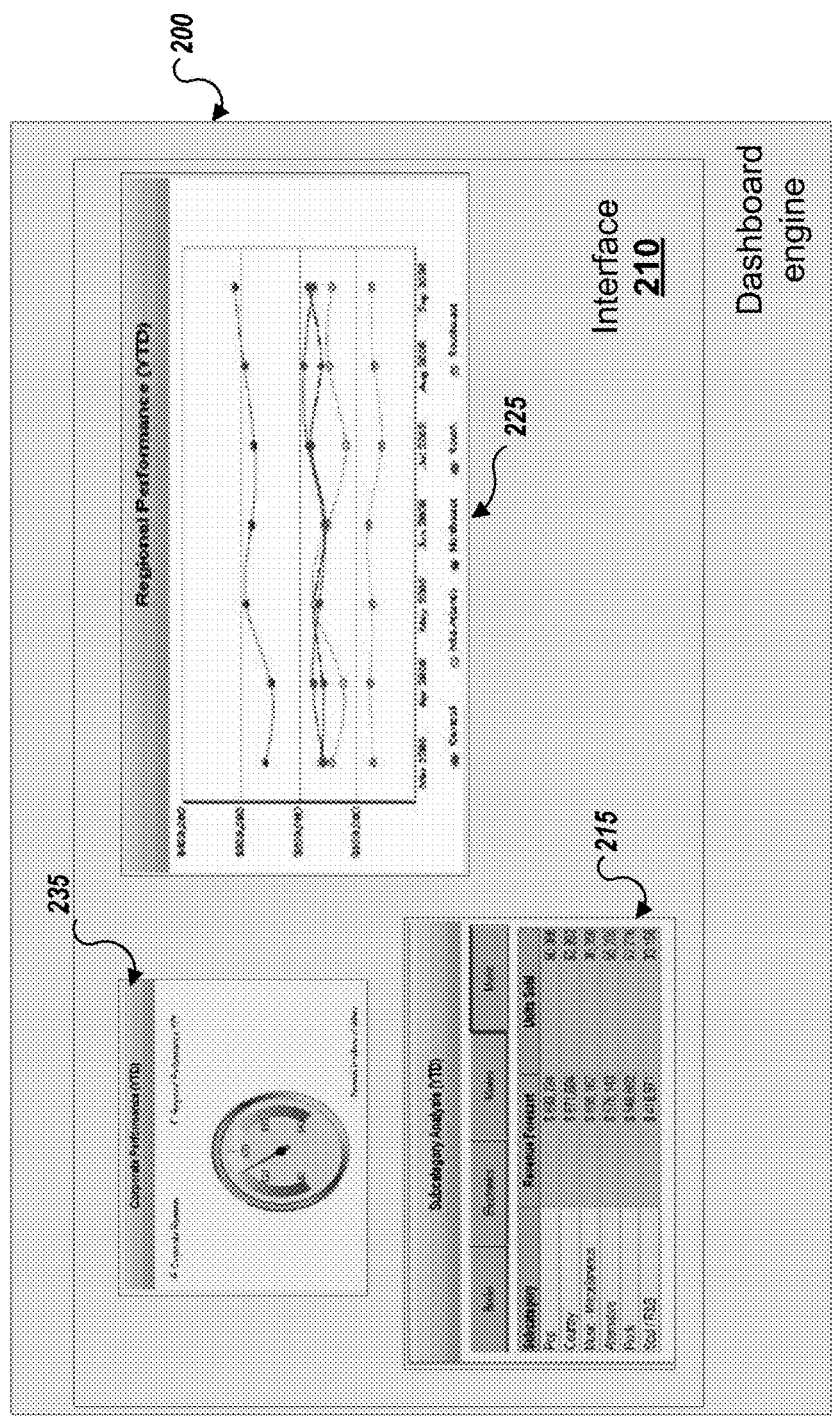
FIG. 2 is a schematic illustration of a dashboard engine.

FIG. 2 is a conceptual illustration of an example dashboard engine 200. Dashboard engine 200 can include a user interface 210 for displaying related sets of data. In some implementations, interface 210 can include a single page so it is easy to view the entire dashboard. For example, interface 210 can be used online rather than printed out. In some implementations, interface 210 can include two or more pages organized as tabs. Interface 210 can provide interactive functionality so users can change how they view the data. For example, a user can specify data to view by selecting one or more filters, metrics or attribute elements to be displayed in a grid and/or graph on interface 210.

In some implementations, dashboard interface 210 can be customized by the viewer. For example, a viewer can choose one or more selectors, widgets, panels, and controls objects such as grids and graphs, to create a personalized, custom dashboard that suits the viewer's needs. Various formatting options, such as gradient colors and 3D effects, may also be available to develop a customized dashboard interface 210 having an appropriate style.

Dashboard engine 200 can receive read-only analytic data through queries (e.g., queries 124a-c of FIG. 1). In some examples, dashboard engine 200 can be used to assess, for instance, company or personal performance. For example, dashboard engine 200 can be used to take a quick status check of a company or to monitor personal work or work group contributions to overall business goals. Through interface 210, the dashboard engine 200 can display key business summaries, such as key performance indicators (KPIs), by presenting them in a visually intuitive, easy-to-read interactive fashion.

Interface 210 can include one or more data visualizations. For example, interface 210 can include a grid 220 that displays a table showing predetermined market data. For example, the data can include revenue forecast and units corresponding to a product category, such as music. In some implementations, interface 210 can include a graph 225 showing, e.g., year-to-date regional performance data. In some implementations, interface 210 can include a chart 235 showing year-to-date corporate performance. Although FIG. 2 shows only three visualizations 215, 225, and 235 more (e.g., 5, 10, or 15 or more) different visualizations can be accommodated depending on a variety of factors including whether there is space on the interface 210. A viewer can customize the interface 210 by placing visualizations 215, 225, and 235 into appropriate areas on interface 210. The viewer can determine placement of the visualizations 215, 225, and 235 taking into account user workflow and granularity. In some examples, the viewer can resize visualizations 215, 225, and 235 as needed.

The dashboard engine 200 can ascertain in advance the content needed for visualizations 215, 225, and 235 and generate a single query or a group of related queries that return a data set from which data for the respective visualizations 215, 225, and 235 can be drawn. For example, in some implementations, two or more visualizations 215-235 can be based on a same or similar underlying data set. For example, the corporate performance chart 235 and the regional performance graph 235 can be based on a same regional performance data. As such, a single query to the underlying data store (e.g., in-memory analytic data store 112) to retrieve data corresponding to the regional performance data can be generated for the visualizations 225 and 235. The dashboard engine 200 can then apply filers and/or perform additional analytics on the retrieved data to provide the results needed for the visualizations 225 and 235.

Figure 3:
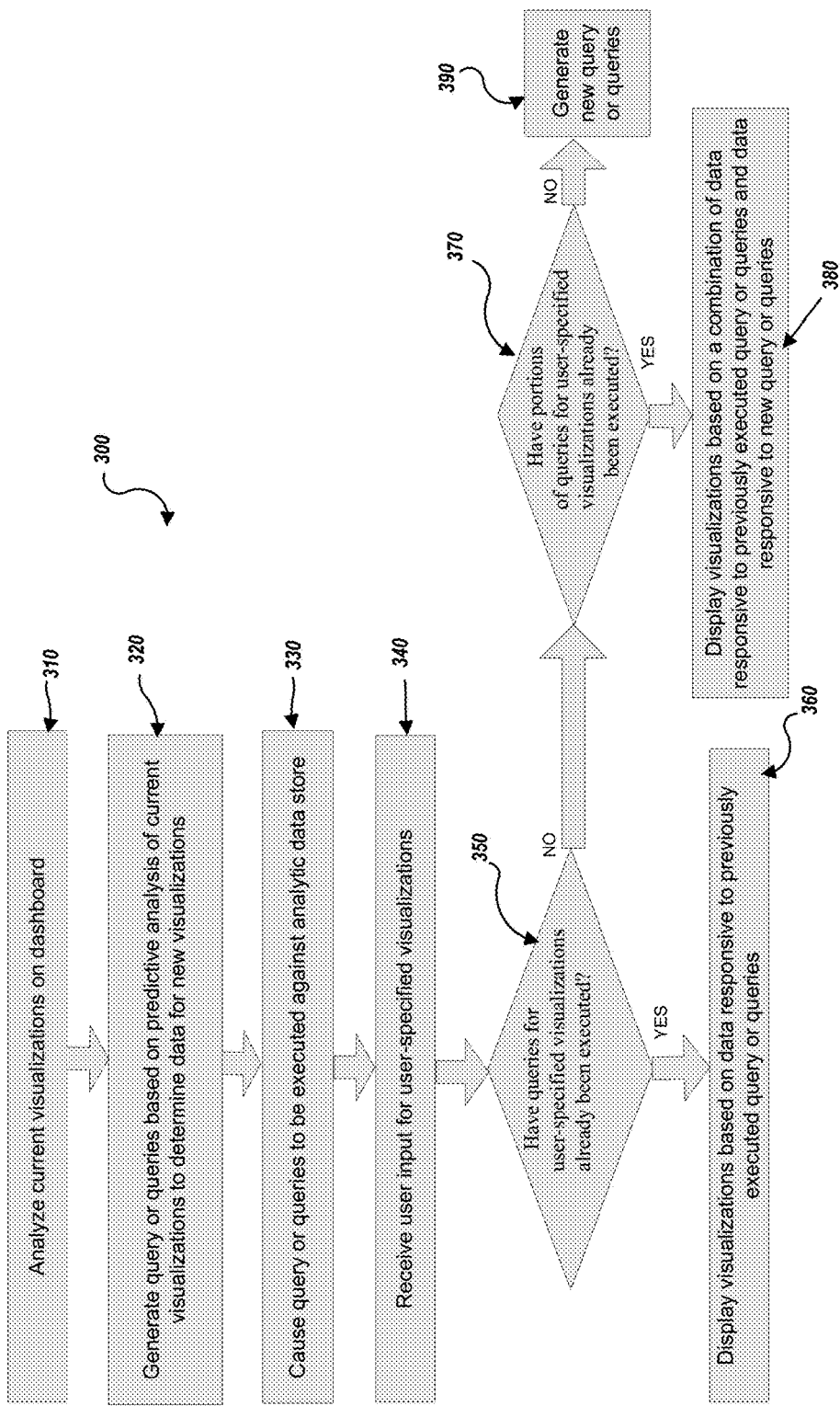
FIG. 3 is a flow chart depicting optimization of analytic operations.

Referring to FIG. 3, a dashboard engine (e.g., dashboard engine 200) can employ example process 300 for optimizing dashboard analytics. Dashboard engine 200 can analyze 310 current visualizations on the dashboard interface (e.g., interface 210) to determine data needed for new visualizations 215, 225, and 235 and/or changes to the current visualizations to present as new visualizations 215, 225, and 235. For example, interface 210 of dashboard engine 200 can provide interactive functionality so users can change how they view the data. For example, a user can specify data to view by selecting one or more filters, metrics or attribute elements to be displayed in the new visualizations 215, 225, and 235. In this manner, the viewer selects filter criteria to specify the content of one or more of the new visualizations 215, 225, and 235.

For example, dashboard engine 200 can predict the data needed for the new visualizations 215, 225, and 235 based on an understanding of the content of the dashboard and historical data. For example, dashboard engine 200 may determine that two example new visualizations, one corresponding to customer transactions over a period of a month and another corresponding to the stores in which those transactions were made, can be combined into a single query to the in-memory analytic store.

In some implementations, dashboard engine 200 can consider visualizations presently displayed and types of inputs that can be provided to those visualizations to result in new and/or changed visualizations 215, 225, and 235. For instance, dashboard engine 200 can analyze historical queries and/or input patterns of a particular user. In an example, a user may always looks through visualizations of data in a particular sequence and so dashboard engine 200 can reasonably predict data needed for the new visualizations. Dashboard engine 200 can also analyze past historical queries and/or input patterns of a plurality of users. For instance, dashboard engine 200 can analyze habits of all users of a particular system as described herein and how they use the data. In some implementations, dashboard engine 200 can also consider time of day, date, and location information corresponding to the historical query and/or input patterns in the analysis.

Dashboard engine 200 can generate 320 a query or queries to be executed on the in-memory analytic store based on the predictive analysis of the visualizations on the dashboard interface 210. For instance, in the example above, dashboard engine 200 can generate a single query to execute on a customer and store transactions database to retrieve information relevant to both the customer transactions and the store information needed for the example new visualizations.

In some implementations, dashboard engine 200 can cause 330, for example, a query execution engine to execute the query and/or queries against the in-memory data store. An example query execution engine that can be used in conjunction with dashboard engine 200 is described in U.S. Provisional Application Nos. 61/931,975, filed Jan. 27, 2014, and 62/021,497, filed Jul. 7, 2014, the contents of which are incorporated in their entirety herein.

Dashboard engine 200 can receive 340 user input (e.g., the user may select one or more filters) specifying certain criteria for user-specified visualizations. For example, for the customer transactions visualization, dashboard engine 200 can specify to view only the relevant customer transaction information in the customer transactions visualization.

Dashboard engine 200 can determine 350 whether a query and/or queries for user-specified visualizations have already been executed on the in-memory analytic data store. If the query and/or queries have been executed on the in-memory data store, dashboard engine 200 can display 360 new visualizations 215, 225, and 235 based on the previously executed query and/or queries.

If the query and/or queries for the user-specified visualizations were not already executed, dashboard engine 200 can determine 370 whether a portion of the query and/or queries for user-specified visualizations have already been executed on the in-memory analytic data store. If the portion of the query and/or queries have been executed on the in-memory data store, dashboard engine 200 can display 380 new visualizations 215, 225, and 235 based on a combination of data responsive to previously executed query or queries and data responsive to new query or queries. For example, dashboard engine 200 can develop and cause to be executed one or more queries to retrieve only data that was not previously retrieved from the in-memory data store. If the query and/or queries were not already executed, and even a portion of the query and/or queries were not already executed, dashboard engine 200 can generate 390 and thus cause a new query and/or queries to be developed and executed on the in-memory analytic data store.

Figure 4:
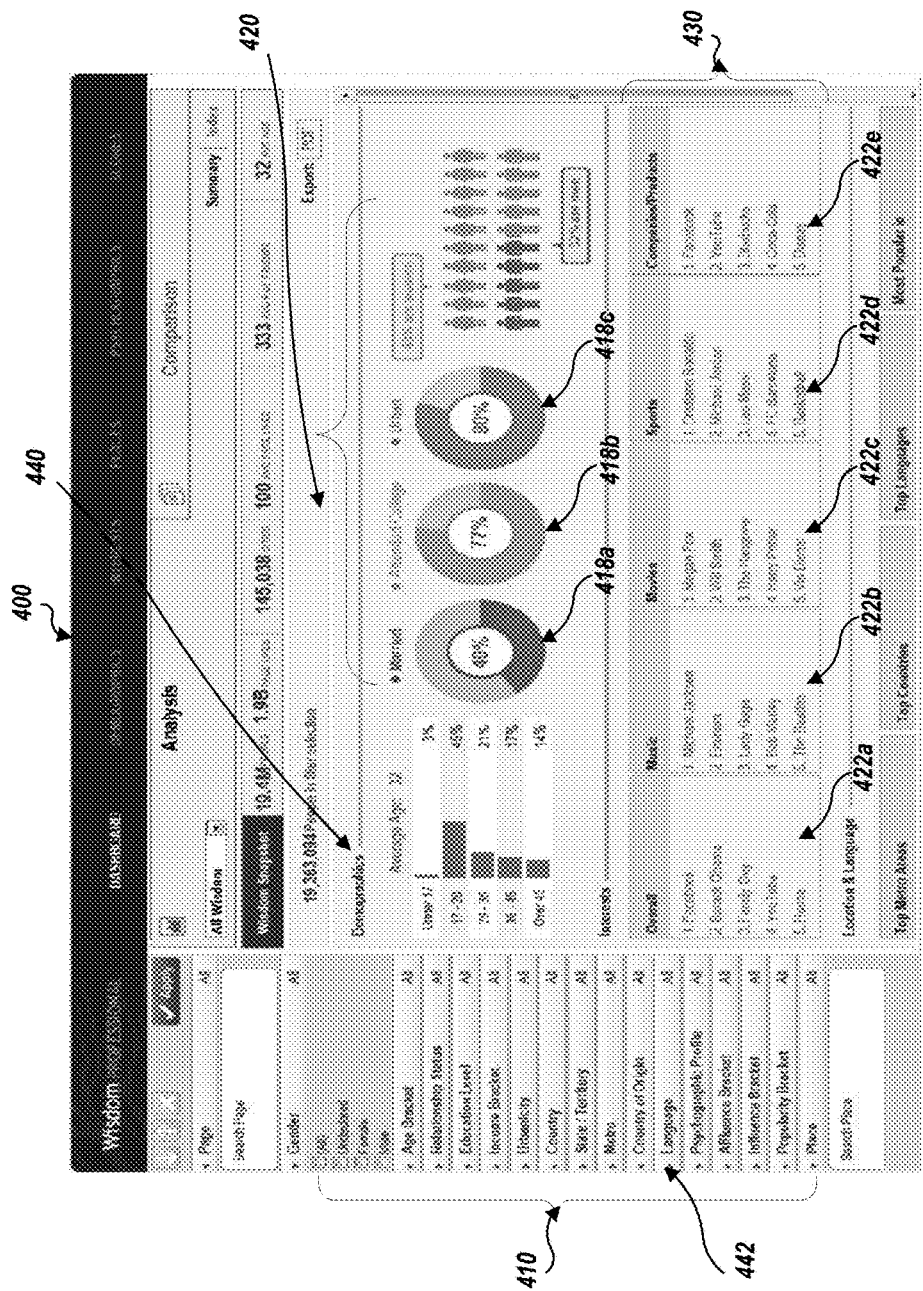
FIG. 4 illustrates an example user interface of an intelligence dashboard.

FIG. 4 illustrates an example user interface 400 of an intelligence dashboard that is coupled to an analytic engine. As shown, interface 400 comprises a plurality of control objects 410-440. Interface 400 includes filter criteria 410 specifying criteria on which a larger data set can be filtered into smaller data subsets. Interface 400 includes graphs 420 and grids (e.g. data displayed in table format) 430. Uses can navigate through the data presented through interface 400 using the filter criteria 410. Interface 400 can be powered by the analytic engine described in this disclosure (e.g., computer system 100 of FIG. 1). In this regard, in some implementations, the analytic engine powers an extensive market intelligence network that provides the data shown in user interface 400.

Computer system 100 can use information about an application and/or design aspects of dashboard 400 to generate queries to the in-memory data store. For example, all of the market intelligence data used by and displayed through the intelligence dashboard interface 400 can be loaded into the in-memory analytic data store. In this example, user interface 400 receives user input defining filter criteria 410 related to the specific market intelligence information a user seeks. As shown, filter criteria 410 can include demographics data or any other type of data as shown in interface 400 or otherwise available to filter the market intelligence data stored in the in-memory analytic data store. For example, the user can filter received data by gender, age, relationship status, education level, income bracket, urbanicity, country, state/territory, metro, country of origin, psychological profile, affluence bracket information, influence bracket information, popularity bracket information, and place.

A dashboard engine (e.g., engine 200 of FIG. 2) can analyze the visualizations on the interface 400 and determine a single broad query or a group of related broad queries to be executed on the in-memory data store. In some implementations, a group of queries can be executed in parallel by corresponding processor cores of a multi-core processor. For example, dashboard engine 200 can predict that, based on the visualizations on interface 400—e.g. gender, education level, urbanicity, etc.—a broad query that generates information on a population of people may be needed. When the results of such a query is returned, dashboard engine 200 can then apply individual filter criteria 410 to the returned results. For example, dashboard engine 200 can apply the filter "relationship status" to obtain a subset of information relating to a portion of the population of people with relationship status as "married." This subset of information can be used for the "Married" visualization 418a on dashboard 400. Similarly, the filter criteria "education level" corresponds to data that can be for the "Attended college" visualization 418b. Filter criteria "Urbanicity" can be used to for data for the "Urban" visualization 418c. Similarly, in some examples, dashboard engine 200 can populate columns 422a-e by applying filters or performing analytics on a larger set of data that is returned through the execution of a broad query.

Other types of output and data visualization can be used. In addition, the user interface 400 can receive additional user input to refine or change the filter criteria 410 or the results sought and the user interface 400 can dynamically update in short order given the in-memory data retrieval and processing that occurs responsive to the additional user input.

As described above, in some implementations, dashboard engine 200 can analyze interface 400 to determine data needed for user-specified visualizations. By analyzing the current visualizations and filter criteria 410, dashboard engine 200 can generate a query and/or queries to execute on the in-memory analytic data store. The query and/or queries are executed in advance of the user's selection of filter criteria 410. In some implementations, interface 400 presents a number of filter criteria 410 any of which the user is likely to select. Each filter criteria 410 can correspond to a different user-specified visualization. For instance, the "Urbanicity" filter criteria corresponds to the "Urban" visualization 418c. Dashboard engine 200 can execute a single query and/or a series of queries to retrieve all underlying data on which the filter criteria 410 can be applied. When the user actually selects one of the filter criteria 410, dashboard engine 200 can display the corresponding visualization without having to generate a new query and/or queries.

In some implementations, the user-specified visualizations can include user-specified changes to currently displayed visualizations such that the changed visualization is presented as the user-specified visualization. For instance, the user can change a value of a particular filter criteria to effect a change in a currently displayed visualization. As an example, a user can change the "Gender" filter criteria to display information for only a female population. As a result of this selection, the visualizations 420, 430 can correspondingly change to display characteristics of only the female population. Dashboard engine 200 can execute a single query and/or a series of queries to retrieve all underlying data on which the "Gender" filter criteria can be applied. When the user actually selects the "Gender" filter, dashboard engine 200 does not need to generate a new query and/or query to the in-memory data store. Dashboard engine 200 can present the new user-specified visualizations immediately based on pre-fetched data corresponding to the query and/or queries that had been executed earlier.

In one example, dashboard engine 200 can predict that a user may select the "Language" filter criteria 442. In this regard, dashboard engine 200 can generate a query to the in-memory analytic store to retrieve data corresponding to the language filter. Then, when the user selects the "Language" filter 442, a corresponding new visualization can be displayed to the user based on the previously retrieved data. This results in faster response time for displaying visualizations to the viewer. If the data for the "Language" filter 442 was not previously retrieved, then dashboard engine 200 can generate a new query to execute on the in-memory analytic data store.

In some examples, a portion of the data needed for the "Language" filter 442 may have been previously retrieved. For example, in connection with one or more of the other filter criteria 410, a portion of the data that can be used in displaying the visualization related to the "Language" filter 442 may have already been retrieved. As such, dashboard engine 200 can generate a query to retrieve only the remaining data needed for completing the data to be used in displaying the visualization related to the "Language" filter 442.

Figure 5:
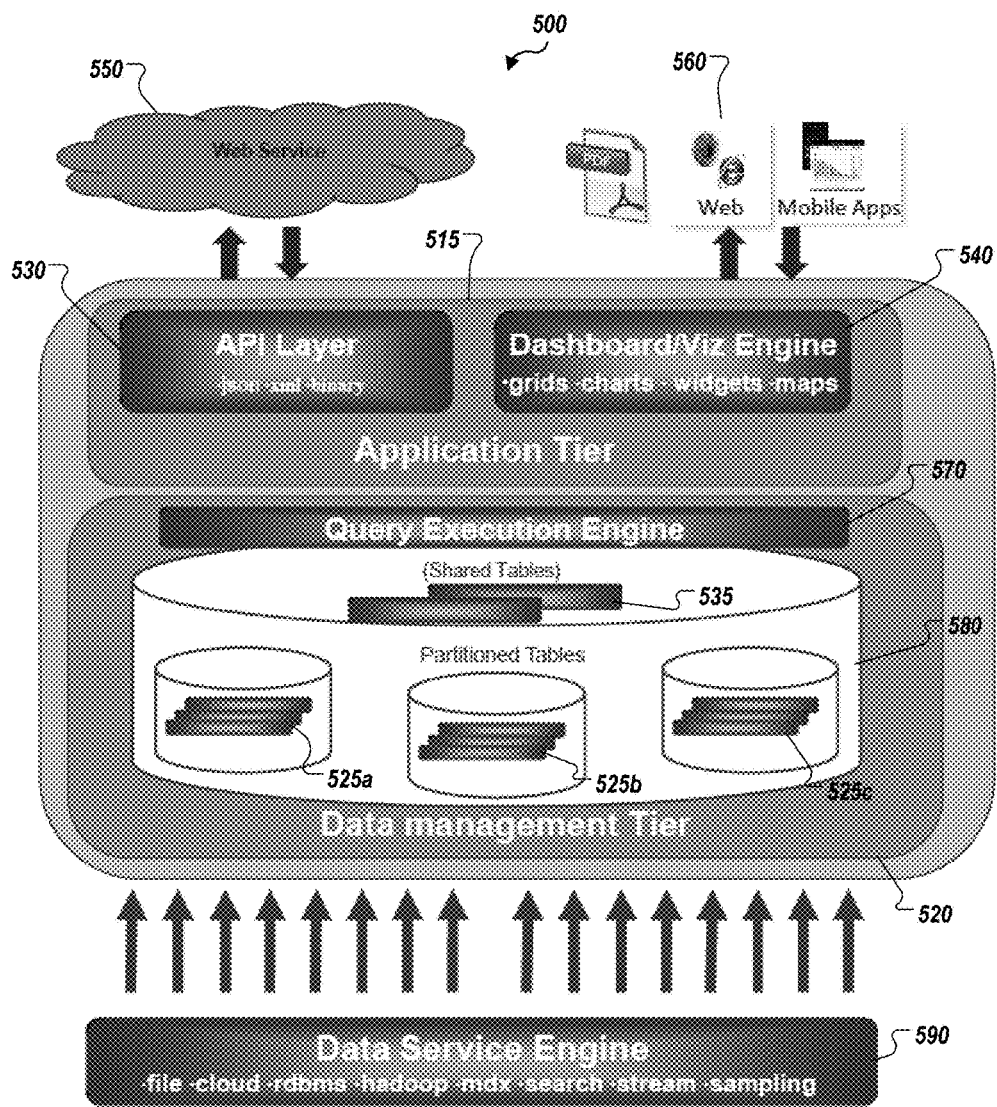
FIG. 5 is a block diagram illustrating an example architecture of a node.

In some implementations, the computer system of FIG. 1 can be implemented on a single node (e.g. a single computer). For example, a computer node can use an operating system RHEL 6.2, can have a 12 core Intel Xeon @ 2.24 GHz central processing unit, and can have 32 GB of RAM. Referring to FIG. 5, an example architecture of a single node 500 is shown. Node 500 can be a server implementing an in-memory analytic data store 580.

Node 500 can include an application tier 515, a data management tier 520, and a data service engine 590. Application tier 515 can include an application programming interface (API) layer 530 and an intelligence dashboard/visualization engine 540 (similar to dashboard engine 200 of FIG. 2). For example, API layer 530 includes specifications describing how components in data management tier 520 can interact with other components, e.g., one or more web services 550. For example, API layer 530 interfaces with web services 550 to receive data from one or more other applications (e.g., market intelligence data) and/or to provide collaborative functionality with the one or more other applications (e.g., receive user input from the one or more other applications and provide data to be output by the one or more other applications).

Dashboard/visualization engine 540 interacts with one or more of web applications, mobile applications, and documents 560 to receive user input and provide user output. For instance, dashboard/visualization engine 540 can generate a user interface 400 as shown in FIG. 4. For example, dashboard/visualization engine 540 can interact with a web or mobile application to output the user interface 400 on a user's device, e.g. a handheld device. Dashboard/visualization engine 540 also can output user interface 400 as a document or file that a user device is able to store and display.

Application tier 510 can be a tightly-coupled with globally optimized query execution across multiple visualizations in single dashboard. For example, application tier 510 can provide information about an application and/or design aspects of a dashboard to the dashboard engine 540. The API layer 530 or dashboard engine 540 can generate queries to the in-memory data store based on, for example, visualizations in the dashboard. Application tier 510 can also include a "data-only" JSON REST API and can provide super-fast search-style selectors. In some implementations, the API layer 530 or dashboard engine 540 can predict the data needed for visualizations by a corresponding application or in the dashboard interface. The API layer 530 dashboard engine 540 can analyze the visualizations selected for the application and/or the interface and, based on the analysis, develop a broad query to send to query execution engine 570.

Data management tier 520 can include query execution engine 570 and an in-memory data store 580. Query execution engine 570 receives queries (similar to queries 124a-c described in connection with FIG. 1) application tier 510 and processes the received queries on data stored in in-memory data store 580. Query execution engine 570 can access data from the in-memory data store 580, perform analytics on the accessed data, and provide, to the application tier 515, the accessed data and/or the results of the performed analytics.

In some implementations, in-memory data store 580 can be partitioned as shown. For example, in-memory data store 580 can be partitioned to include, e.g., multiple partitioned tables 525a-c and one or more shared tables 535 that are stored in-memory. Query execution engine 570 is configured to process queries to multiple partitioned tables 525a-c and one or more shared tables 535 in parallel to provide fast data retrieval and enable a larger volume of data to be stored in-memory. For example, partition tables 525a-c can include a plurality of customer transaction records. Data management tier 520 can be a high-performance in-memory data tier that performs distributed in-memory analytics on the customer transaction records.

Data service engine 590 can receive data from multiple high volume data storage systems and load the received data into the in-memory data store 580 in the data management tier 520. The data service engine 590 can perform parallel data loading into the in-memory data store 580 from multiple data sources. The loaded data can be all of the market intelligence data accessible to generate output through the dashboard/visualization engine 540. For example, data service engine 590 loaded information can be based on one or more of information contained on files, the cloud, a relational database management system (RDMBS), information from Apache Hadoop (an open source software framework for large scale storage and processing of data), multidimensional expressions (MDX), search query results, stream, and sampling information. In some implementations, any arbitrary schema can be loaded into the in-memory analytic data store.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or large clusters of servers, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications can be made without departing from the spirit and scope of the disclosure. Accordingly, other implementations are within the scope of the disclosure.

What is claimed is:

1. A computer-implemented method comprising:
    receiving, by a data storage system, a request to generate a visualization of a portion of data stored in the data storage system;
    in response to receiving the request to generate the visualization of the portion of the data stored in the data storage system, generating the visualization of the portion of the data stored in the data storage system;
    providing, for display, the visualization of the portion of the data stored in the data storage system;
    accessing historical data that indicates actions performed on previously displayed visualizations of the portion of the data stored in the data storage system and other portions of the data stored in the data storage system;
    analyzing (i) the visualization of the portion of the data stored in the data storage system and (ii) the historical data that indicates actions performed on the previously displayed visualizations of the portion of the data stored in the data storage system and the other portions of the data stored in the data storage system;
    based on analyzing (i) the visualization of the portion of the data stored in the data storage system and (ii) the historical data that indicates actions performed on the previously displayed visualizations of the portion of the data stored in the data storage system and the other portions of the data stored in the data storage system, generating an action to perform on the visualization of the portion of the data;
    performing, in background, the generated action on the visualization and the portion of the data;
    suppressing updates to the visualization based on results of the performance of the generated action;
    storing (i) the results of the performance of the generated action and (ii) the updates to the visualization based on results of the performance of the generated action;
    receiving, from a user, a user specified action to perform on the visualization of the portion of the data;
    in response to receiving the user specified action, determining that the user specified action includes the generated action;
    based on determining that the user specified action includes the generated action:
        suppressing performance of the user specified action; and
        accessing, without reperforming the generated action, (i) the results of the performance of the generated action and (ii) the updates to the visualization based on the results of the performance of the generated action; and
    updating the visualization based on (i) the accessed results of the performance of the generated action, and (ii) the accessed updates to the visualization based on the results of the performance of the generated action.

2. The method of claim 1, comprising:
    based on analyzing (i) the updated visualization of the portion of the data stored in the data storage system and (ii) the historical data that indicates actions performed on the previously displayed visualizations of the portion of the data stored in the data storage system and the other portions of the data stored in the data storage system, generating an additional action to perform on the updated visualization of the portion of the data;
    performing, in the background, the additional generated action on the updated visualization and the portion of the data;
    suppressing additional updates to the updated visualization based on results of the performance of the additional generated action;
    storing (i) the results of the performance of the additional generated action and (ii) the additional updates to the updated visualization based on the results of the performance of the additional generated action;
    receiving, from the user, an additional user specified action to perform on the updated visualization of the portion of the data;
    in response to receiving the user specified action, determining that the additional user specified action is not the additional generated action;
    based on determining that the additional user specified action is not the additional generated action, performing the additional user specified action; and
    updating the updated visualization based on results of the performance of the additional user specified action.

3. The method of claim 1, wherein each action is a query or a request to filter the portion of the data stored in the data storage system.

4. The method of claim 1, wherein accessing historical data that indicates actions performed on previously displayed visualizations of the portion of the data stored in the data storage system and other portions of the data stored in the data storage system comprises:
    accessing historical data generated by the user.

5. The method of claim 1, wherein accessing historical data that indicates actions performed on previously displayed visualizations of the portion of the data stored in the data storage system and other portions of the data stored in the data storage system comprises:
    accessing historical data generated by a group of users that includes the user.

6. The method of claim 1, wherein the historical data further includes a time and date corresponding to each action and a location of a previous user who requested each action.

7. The method of claim 1, wherein the data storage system is an in-memory data store.

8. The method of claim 1, wherein accessing historical data that indicates actions performed on previously displayed visualizations of the portion of the data stored in the data storage system and other portions of the data stored in the data storage system comprises:
  accessing historical data that indicates actions performed on previously displayed visualizations of the portion of the data stored in the data storage system.

9. The method of claim 1, wherein accessing historical data that indicates actions performed on previously displayed visualizations of the portion of the data stored in the data storage system and other portions of the data stored in the data storage system comprises:
  accessing historical data that indicates actions performed on previously displayed visualizations on data from other data storage systems.

10. The method of claim 1, wherein generating an action to perform on the visualization of the portion of the data comprises:
  determining that a score that reflects a probability that a request to perform the action will be received from a user satisfies a threshold score.

11. A system comprising:
  one or more computers and one or more storage devices storing instructions that are operable, when executed by the one or more computers, to cause the one or more computers to perform operations comprising:
    receiving, by a data storage system, a request to generate a visualization of a portion of data stored in the data storage system;
    in response to receiving the request to generate the visualization of the portion of the data stored in the data storage system, generating the visualization of the portion of the data stored in the data storage system;
    providing, for display, the visualization of the portion of the data stored in the data storage system;
    accessing historical data that indicates actions performed on previously displayed visualizations of the portion of the data stored in the data storage system and other portions of the data stored in the data storage system;
    analyzing (i) the visualization of the portion of the data stored in the data storage system and (ii) the historical data that indicates actions performed on the previously displayed visualizations of the portion of the data stored in the data storage system and the other portions of the data stored in the data storage system;
    based on analyzing (i) the visualization of the portion of the data stored in the data storage system and (ii) the historical data that indicates actions performed on the previously displayed visualizations of the portion of the data stored in the data storage system and the other portions of the data stored in the data storage system, generating an action to perform on the visualization of the portion of the data;
    performing, in background, the generated action on the visualization and the portion of the data;
    suppressing updates to the visualization based on results of the performance of the generated action;
    storing (i) the results of the performance of the generated action and (ii) the updates to the visualization based on results of the performance of the generated action;
    receiving, from a user, a user specified action to perform on the visualization of the portion of the data;
    in response to receiving the user specified action, determining that the user specified action includes the generated action;
    based on determining that the user specified action includes the generated action:
      suppressing performance of the user specified action; and
      accessing, without reperforming the generated action, (i) the results of the performance of the generated action and (ii) the updates to the visualization based on the results of the performance of the generated action; and
    updating the visualization based on (i) the accessed results of the performance of the generated action, and (ii) the accessed updates to the visualization based on the results of the performance of the generated action.

12. The system of claim 11, wherein the operations further comprise:
  based on analyzing the historical data that indicates actions performed on the previously displayed visualizations of the portion of the data stored in the data storage system and the other portions of the data stored in the data storage system, generating an additional action to perform on the updated visualization of the portion of the data;
  based on analyzing (i) the updated visualization of the portion of the data stored in the data storage system and (ii) the historical data that indicates actions performed on the previously displayed visualizations of the portion of the data stored in the data storage system and the other portions of the data stored in the data storage system, generating an additional action to perform on the updated visualization of the portion of the data;
  performing, in the background, the additional generated action on the updated visualization and the portion of the data;
  suppressing additional updates to the updated visualization based on results of the performance of the additional generated action;
  storing (i) the results of the performance of the additional generated action and (ii) the additional updates to the updated visualization based on the results of the performance of the additional generated action;
  receiving, from the user, an additional user specified action to perform on the updated visualization of the portion of the data;
  in response to receiving the user specified action, determining that the additional user specified action is not the additional generated action;
  based on determining that the additional user specified action is not the additional generated action, performing the additional user specified action; and
  updating the updated visualization based on results of the performance of the additional user specified action.

13. The system of claim 11, wherein accessing historical data that indicates actions performed on previously displayed visualizations of the portion of the data stored in the data storage system and other portions of the data stored in the data storage system comprises:
  accessing historical data generated by the user.

14. The system of claim 11, wherein accessing historical data that indicates actions performed on previously displayed visualizations of the portion of the data stored in the data storage system and other portions of the data stored in the data storage system comprises:
  accessing historical data generated by a group of users that includes the user.

15. The system of claim 11, wherein accessing historical data that indicates actions performed on previously displayed visualizations of the portion of the data stored in the data storage system and other portions of the data stored in the data storage system comprises:

accessing historical data that indicates actions performed on previously displayed visualizations of the portion of the data stored in the data storage system.

16. The system of claim 11, wherein accessing historical data that indicates actions performed on previously displayed visualizations of the portion of the data stored in the data storage system and other portions of the data stored in the data storage system comprises:

accessing historical data that indicates actions performed on previously displayed visualizations on data from other data storage systems.

17. The system of claim 11, wherein generating an action to perform on the visualization of the portion of the data comprises:

determining that a score that reflects a probability that a request to perform the action will be received from a user satisfies a threshold score.

18. A non-transitory computer-readable medium storing software comprising instructions executable by one or more computers which, upon such execution, cause the one or more computers to perform operations comprising:

receiving, by a data storage system, a request to generate a visualization of a portion of data stored in the data storage system;

in response to receiving the request to generate the visualization of the portion of the data stored in the data storage system, generating the visualization of the portion of the data stored in the data storage system;

providing, for display, the visualization of the portion of the data stored in the data storage system;

accessing historical data that indicates actions performed on previously displayed visualizations of the portion of the data stored in the data storage system and other portions of the data stored in the data storage system;

analyzing (i) the visualization of the portion of the data stored in the data storage system and (ii) the historical data that indicates actions performed on the previously displayed visualizations of the portion of the data stored in the data storage system and the other portions of the data stored in the data storage system;

based on analyzing (i) the visualization of the portion of the data stored in the data storage system and (ii) the historical data that indicates actions performed on the previously displayed visualizations of the portion of the data stored in the data storage system and the other portions of the data stored in the data storage system, generating an action to perform on the visualization of the portion of the data;

performing, in background, the generated action on the visualization and the portion of the data;

suppressing updates to the visualization based on results of the performance of the generated action;

storing (i) the results of the performance of the generated action and (ii) the updates to the visualization based on results of the performance of the generated action;

receiving, from a user, a user specified action to perform on the visualization of the portion of the data;

in response to receiving the user specified action, determining that the user specified action includes the generated action;

based on determining that the user specified action includes the generated action:

suppressing performance of the user specified action; and accessing, without reperforming the generated action, (i) the results of the performance of the generated action and (ii) the updates to the visualization based on the results of the performance of the generated action; and updating the visualization based on (i) the accessed results of the performance of the generated action, and (ii) the accessed updates to the visualization based on the results of the performance of the generated action.

19. The method of claim 1, wherein a first time period between (i) receiving the user specified action and (ii) updating the visualization based on (a) the accessed results of the performance of the generated action, and (b) the updates to the visualization based on the results of the performance of the generated action is less than a second time period (i) between receiving an additional user specified action that was not performed in the background and (ii) updating the visualization based on performance of the additional user specified action.

* * * * *